June 16, 1931.  W. C. HEDGCOCK  1,810,210
SUPPORTING MEANS FOR BRAKES
Filed Dec. 15, 1928
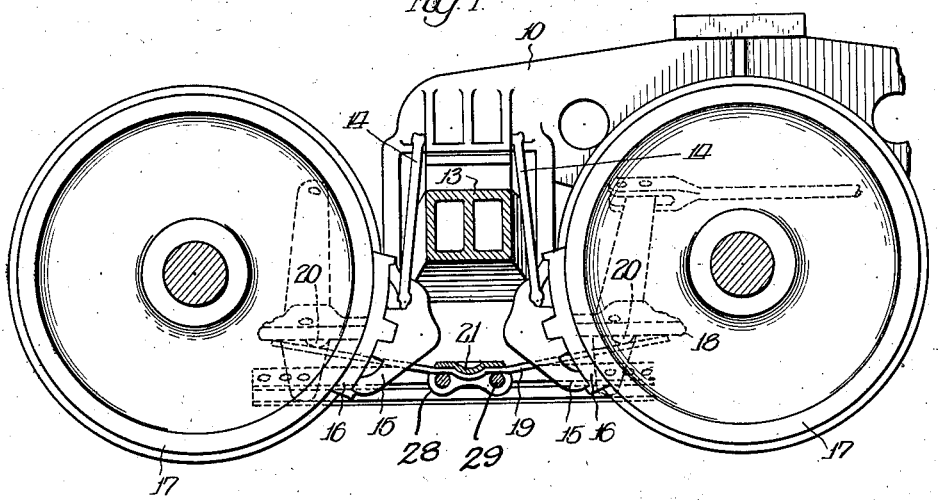
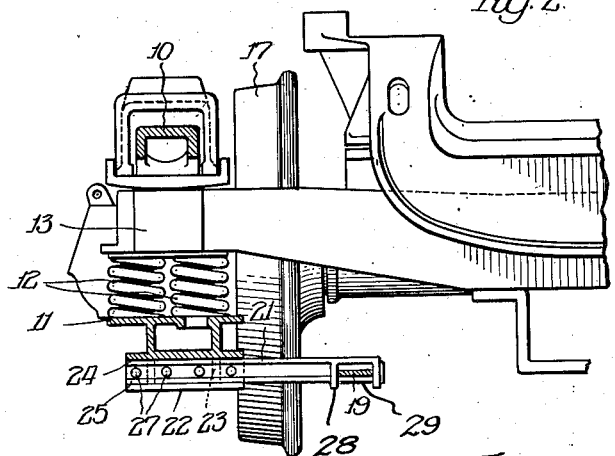
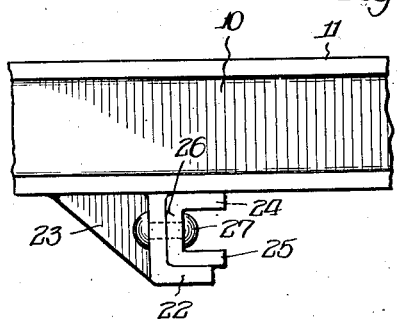
Inventor:
William C. Hedgcock,
By Wilkinson, Huxley, Byron & Knight
Attys.

Patented June 16, 1931

1,810,210

UNITED STATES PATENT OFFICE

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY

SUPPORTING MEANS FOR BRAKES

Application filed December 15, 1928. Serial No. 326,243.

This invention relates to supporting means for brakes, and more particularly to means for supporting and leveling brake beams carried by railway car trucks.

One object of the invention is to provide simple, durable, reliable and inexpensive means for supporting brake beam safety and leveling members.

Another object is to provide a cooperative association between the side frames and brake beam safety and leveling means, which association is simple, economical and efficient.

Another object is to provide a car truck in which the various elements cooperate in a new and improved manner and in a manner to meet all of the requirements under service conditions.

These and other objects are accomplished by means of the arrangement disclosed on the accompanying sheet of drawings, in which—

Figure 1 is a fragmentary side elevation of a railway car truck embodying our invention;

Figure 2 is a transverse sectional view of the same; and

Figure 3 is an end view of the arm which carries the bar for supporting and leveling the brake beams.

The various novel features of the invention will be apparent from the following description and drawings and will be particularly pointed out in the appended claims.

Referring to the figures of the drawings, it will be noted that the invention is illustrated in connection with a railway car truck having oppositely arranged side frames 10, each of which is provided with the usual bolster opening, the floor 11 of which forms a seat for springs 12 upon which the associated end of the bolster 13 is mounted. Suitably supported hanger brackets 14 are provided, to the lower ends of which brake heads 15 are pivotally connected, said brake heads carrying brake shoes 16 which are adapted to be applied to the treads of truck wheels 17 for braking purposes. The brake heads are operatively connected to opposite ends of brake beams 18, under which are located brake beam safety and leveling bars 19, the outer ends of which are tilted slightly upwardly and are slidably engaged by shoes 20 carried by suitable portions of the brake beams. As a result thereof, not only do the members 19 serve to prevent the brake beams from falling to the ground in the event that they are torn from their normal hangings, but also serve to guide the brake beams in a manner whereby the braking surfaces of the brake shoes at all times are parallel with the treads of the associated truck wheels.

This invention relates particularly to means for carrying or supporting the brake beam safety and leveling means 19. Referring to the figures of the drawings, it will be seen that such means takes the form of arms 21, one extending laterally inwardly from each of the side frames 10. Each arm 21 for most of its length is channel shaped in section, and one end portion thereof is seated in an integrally formed L-shaped projection 22 on the under side of the side frame 10. The L-shaped projection extends transversely of the side frame throughout the width of the latter at the middle point longitudinally thereof and is reinforced by a plurality of webs 23. The upper flange 24 of the arm 21 engages the bottom of the side frame, the lower flange 25 of said arm 21 engages the lower horizontal portion of the L-shaped projection, and the web 26 engages the vertical portion of the L-shaped projection 22.

To secure the parts together, a plurality of rivets 27 are passed horizontally through the web 26 of the arm 21 and the vertical portion of the L-shaped projection 22. While most of the load carried by the arm 21 is transferred directly to the L-shaped projection and the lower part of the side frame, it will be appreciated whatever strains are transmitted to the rivets 27 will be of a shearing nature. By means of this arrangement, the arm 21 cannot become loosened with respect to the side frame 10 regardless of service conditions.

The inner end of each of the arms 21 is provided with downwardly and laterally extending apertured ears 28 for the reception of pins 29 which hold the brake beam safety and leveling members 19 in operative position between said ears. In this way the brake beam safety and leveling members 19 are properly supported for performing their functions. The supporting means for said members 19 are simple, inexpensive and durable, and meet service requirements.

It is my intention to cover all modifications of the device falling within the spirit and scope of the appended claims.

I claim:

1. In a railway car truck, the combination of a side frame having on its under side a depending L-shaped projection, an arm extending laterally from said side frame for carrying a brake beam engaging element and having a portion seated in said L-shaped projection, and means extending through said projection and arm for securing together said parts.

2. In a railway car truck, the combination of a side frame having on its under side a depending L-shaped projection, an arm extending laterally from said side frame for carrying a brake beam engaging element and having a channel shaped portion seated in said L-shaped projection, and means extending through said projection and the channel shaped portion of said arm for securing together said parts.

3. In a railway car truck, the combination of a side frame having on its under side a depending angle shaped projection, an arm extending laterally from said side frame for carrying a brake beam engaging element and having a portion thereof seated in said angle shaped projection, and fastening elements cooperating with said angle shaped projection and said arm for securing together said parts.

Signed at Chicago, Illinois, this 11th day of December, 1928.

WILLIAM C. HEDGCOCK.